United States Patent
Andrews et al.

(10) Patent No.: US 7,537,857 B2
(45) Date of Patent: May 26, 2009

(54) REDUCED DEGRADATION OF ION-EXCHANGE MEMBRANES IN ELECTROCHEMICAL FUEL CELLS

(75) Inventors: Neil R. Andrews, North Vancouver (CA); Shanna D. Knights, Burnaby (CA); Kenneth A. Murray, Port Coquitlam (CA); Scott J. McDermid, Vancouver (CA); Sean M. MacKinnon, Burnaby (CA); Siyu Ye, Burnaby (CA)

(73) Assignee: BDF IP Holdings Ltd., Vancouver, BC (CA)

( * ) Notice: Subject to any disclaimer, the term of this patent is extended or adjusted under 35 U.S.C. 154(b) by 661 days.

(21) Appl. No.: 10/738,962

(22) Filed: Dec. 17, 2003

(65) Prior Publication Data

US 2005/0136308 A1    Jun. 23, 2005

(51) Int. Cl.
*H01M 8/02* (2006.01)
*H01M 4/86* (2006.01)

(52) U.S. Cl. .......................................... 429/40; 429/44
(58) Field of Classification Search .................. 429/40, 429/44
See application file for complete search history.

(56) References Cited

U.S. PATENT DOCUMENTS

| 3,497,389 A |   | 2/1970 | Berger et al. ................... 136/86 |
| 5,679,482 A | * | 10/1997 | Ehrenberg et al. ........... 429/249 |
| 6,248,469 B1 | * | 6/2001 | Formato et al. ............... 429/41 |
| 6,335,112 B1 | * | 1/2002 | Asukabe et al. ............... 429/30 |
| 7,070,878 B2 | * | 7/2006 | Venkatesan et al. ........... 429/42 |
| 2003/0008196 A1 | * | 1/2003 | Wessel et al. .................. 429/40 |
| 2003/0113605 A1 |   | 6/2003 | Hidaka et al. .................. 429/33 |
| 2003/0118884 A1 |   | 6/2003 | Hampden-Smith et al. .... 429/30 |
| 2003/0198849 A1 |   | 10/2003 | Hampden-Smith et al. .... 429/30 |
| 2004/0043283 A1 |   | 3/2004 | Cipollini et al. .............. 429/40 |
| 2005/0095355 A1 |   | 5/2005 | Leistra et al. .................. 427/58 |

FOREIGN PATENT DOCUMENTS

| EP | 1 289 041 A2 | 3/2003 |
| JP | 2001-118591 | 4/2001 |
| JP | 2003-77492 | 3/2003 |
| JP | 2003-123777 | 4/2003 |

OTHER PUBLICATIONS

Pozio, A. et al., "Nafion Degradation in PEFCs from End Plate Iron Contamination," *Electrochimica Acta 00*:1-7, 2003.

* cited by examiner

*Primary Examiner*—Mark Ruthkosky
(74) *Attorney, Agent, or Firm*—Seed IP Law Group PLLC

(57) ABSTRACT

A significant problem in PEM fuel cell durability is in premature failure of the ion-exchange membrane and in particular by the degradation of the ion-exchange membrane by reactive hydrogen peroxide species. Such degradation can be reduced or eliminated by the presence of an additive in the anode, cathode or ion-exchange membrane. The additive may be a radical scavenger, a membrane cross-linker, a hydrogen peroxide decomposition catalyst and/or a hydrogen peroxide stabilizer. The presence of the additive in the membrane electrode assembly (MEA) may however result in reduced performance of the PEM fuel cell. Accordingly, it may be desirable to restrict the location of the additive to locations of increased susceptibility to membrane degradation such as the inlet and/or outlet regions of the MEA.

21 Claims, 6 Drawing Sheets

REDUCED DEGRADATION OF ION-EXCHANGE MEMBRANES IN ELECTROCHEMICAL FUEL CELLS

BACKGROUND OF THE INVENTION

1 Field of the Invention

The present invention relates to ion-exchange membranes and more particularly to ion-exchange membranes for electrochemical fuel cells.

2. Description of the Related Art

Electrochemical fuel cells convert reactants, namely fuel and oxidant streams, to generate electric power and reaction products. Electrochemical fuel cells generally employ an electrolyte disposed between two electrodes namely a cathode and an anode. An electrocatalyst is needed to induce the desired electrochemical reactions at the electrodes. In addition to electrocatalyst, the electrodes may also comprise an electrically conductive substrate upon which the electrocatalyst is deposited. The electrocatalyst may be a metal black (namely, a substantively pure, unsupported, finely divided metal or metal powder) an alloy or a supported metal catalyst, for example, platinum on carbon particles.

A proton exchange membrane (PEM) fuel cell is a type of electrochemical fuel cell which employs a membrane electrode assembly ("MEA"). The MEA comprises a solid polymer electrolyte or ion-exchange membrane disposed between the cathode and anode. The ion-exchange membranes of particular interest are those prepared from fluoropolymers and which contain pendant sulfonic acid functional groups and/or carboxylic acid functional groups. A typical perfluorosulfonic acid/PTFE copolymer membrane can be obtained from DuPont Inc under the trade designation Nafion®.

Each electrode contains a catalyst layer, comprising an appropriate catalyst, located next to the solid polymer electrolyte. The catalyst is typically a precious metal composition (e.g., platinum metal black or an alloy thereof) and may be provided on a suitable support (e.g., fine platinum particles supported on a carbon black support). The catalyst layers may also contain ionomer. The electrodes may also contain a porous, electrically conductive substrate that may be employed for purposes of mechanical support, electrical conduction, and/or reactant distribution, thus serving as a fluid diffusion layer. The MEA may be manufactured, for example, by bonding an anode fluid diffusion electrode, an ion-exchange membrane and a cathode fluid diffusion electrode together under the application of heat and pressure. Another method involves coating the catalyst layers directly onto an ion-exchange membrane to form a catalyst coated membrane and then bonding fluid diffusion layers thereon.

Flow fields for directing reactants across one surface of each electrode or electrode substrate, are disposed on each side of the MEA. In operation, the output voltage of an individual fuel cell under load is generally below one volt. Therefore, in order to provide greater output voltage, numerous cells are usually stacked together and are connected in series to create a higher voltage fuel cell stack.

During normal operation of a PEM fuel cell, fuel is electrochemically oxidized at the anode catalyst, typically resulting in the generation of protons, electrons, and possibly other species depending on the fuel employed. The protons are conducted from the reaction sites at which they are generated, through the ion-exchange membrane, to electrochemically react with the oxidant at the cathode exhaust. The electrons travel through an external circuit providing useable power and then react with the protons and oxidant at the cathode catalyst to generate water reaction product.

A broad range of reactants can be used in PEM fuel cells and may be supplied in either gaseous or liquid form. For example, the oxidant stream may be substantially pure oxygen gas or a dilute oxygen stream such as air. The fuel may be, for example, substantially pure hydrogen gas, a gaseous hydrogen-containing reformate stream, or an aqueous liquid methanol mixture in a direct methanol fuel cell.

For a PEM fuel cell to be used commercially in either stationary or transportation applications, a sufficient lifetime is necessary. For example, 5,000 hour or longer operations may be routinely required. One known failure mode that decreases lifetime relates to degradation of the ion-exchange membrane by, for example, reaction with reactive species such as hydrogen peroxide formed within the fuel cell environment. U.S. Pat. No. 6,335,112, U.S. patent application No. 2003/0008196, and Japanese Patent Application No. 2003-123777 (all herein incorporated by reference in their entirety), all disclose the use of various catalysts for the decomposition of hydrogen peroxide species. These catalysts are dispersed in the ion-exchange membrane and/or in the cathode catalyst layer to improve lifetimes of hydrocarbon and fluorocarbon based ion-exchange membranes. However, there remains a need in the art to understand the degradation of ion-exchange membranes within the fuel cell environment and to develop further improvements to mitigate or eliminate such degradation. The present invention helps fulfill this need and provides further related advantages.

BRIEF SUMMARY OF THE INVENTION

An additive may be applied to an MEA to reduce membrane degradation. However, there may be unintended consequences by such an application of an additive to either the ion-exchange membrane or a catalyst layer. For example, a fuel cell may suffer a performance loss with the application of such an additive. However, it may not be necessary to apply the additive uniformly across the membrane electrode assembly (MEA) and the additive may instead be applied in a manner that mitigates against such unintended consequences. Accordingly, a membrane electrode assembly may comprise:

an anode and a cathode fluid diffusion layer;

an ion-exchange membrane interposed between the anode and cathode fluid diffusion layers; and an anode catalyst layer and a cathode catalyst layer interposed between the ion-exchange membrane and the respective fluid diffusion layer.

Further at least one of the ion-exchange membrane, the cathode catalyst layer and the anode catalyst layer non-uniformly supports at least one additive. The additive may be a radical scavenger, a membrane cross-linker, a hydrogen peroxide decomposition catalyst and a hydrogen peroxide stabilizer.

In particular, the non-uniform support may be in the x-y plane of the MEA and not in the through plane (z-direction) of the MEA. In some embodiments, there may be an increased loading of the additive in regions of the MEA that are more susceptible to membrane degradation. In some embodiments, such regions of increased susceptibility to membrane degradation are in the inlet and/or outlet regions of the MEA.

Non-uniform support may mean that the loading of the additive varies across the x-y plane or alternatively, that there are regions of the MEA with little to no additive present. For example, there may be less than 80% coverage of the additive in the x-y plane. In a more particular embodiment, there may be less than 50% or less than 25% coverage of the additive in the x-y plane. For example, there may be between 1 and 25%, more particularly between 10 and 25% and even more particularly between 15 and 25% coverage of the additive in the x-y plane.

Additive supported on the ion-exchange membrane means that the additive is either dispersed within the membrane or in a separate layer applied to the surface of the membrane. Similarly, additive supported on the anode or cathode catalyst layer may be either dispersed within the catalyst layer or in a separate layer applied to the catalyst layer. If the additive is in a separate layer on either the ion-exchange membrane or the catalyst layer, the layer may additionally comprise, for example, ionomer.

In manufacturing an MEA, either an ion-exchange membrane can be interposed between two fluid diffusion electrodes or a catalyst-coated membrane can be bonded between two fluid diffusion layers. In an embodiment, a fluid diffusion electrode comprises a fluid diffusion layer and a catalyst layer which non-uniformly supports at least one additive.

In another embodiment, an ion-exchange membrane non-uniformly supports at least one additive. As mentioned above, supports means that the additive is either dispersed within the ion-exchange membrane or in a separate layer on the surface of the ion-exchange membrane. If the additive is supported in a separate layer on the surface of the membrane, the separate layer may further comprise catalyst particles. In other words, in this further embodiment, the ion-exchange membrane is a catalyst-coated membrane and both the ion-exchange membrane and the catalyst layer supports the additive. The ion-exchange membrane supports the additive as it is in a separate layer on the surface thereof and the catalyst layer supports the additive as it is dispersed therein.

Hydrogen peroxide is suspected to be the main cause of membrane degradation. As such, there are many different classes of compounds that can provide protective effects within the fuel cell environment. For example, the additive may be a radical scavenger, a membrane cross-linker, a hydrogen peroxide decomposition catalyst, a hydrogen peroxide stabilizer, or a composition thereof. Further, these classes of compounds are not necessarily distinct such that some compounds may belong in more than one class.

Examples of radical scavengers include: hindered amines, hydroxylamines, arylamines, phenols, BHT, phosphites, benzofuranones, salicylic acid, azulenyl nitrones and derivatives thereof, tocopherols, DMPO, cyclic and acyclic nitrones, gold-chitosan nanocomposites, ascorbic acid and $Mn^{2+}$. Examples of membrane cross-linkers include: multivalent cations such as $Al^{3+}$, $Mn^{2+}$, $Mg^{2+}$ and $Zn^{2+}$.

Examples of hydrogen peroxide decomposition catalysts include: organometallic Mn(II) or Mn(III) complexes, oxide catalysts, mixed oxide catalysts, and phosphites. Further examples of hydrogen peroxide decomposition catalysts include: a salt, oxide or organometallic complex of Co, Fe, Cr, Mn, Cu, V, Ru, Pd, Ni, Mo, Sn and W. Examples of hydrogen peroxide stabilizers include stannic oxide, sodium aluminate, hydrous alumina, $Zn^{2+}$ and sodium pyrophosphate or a precursor thereof.

These and other aspects of the invention will be evident upon reference to the attached figures and following detailed description.

DETAILED DESCRIPTION OF THE INVENTION

Figure 1:
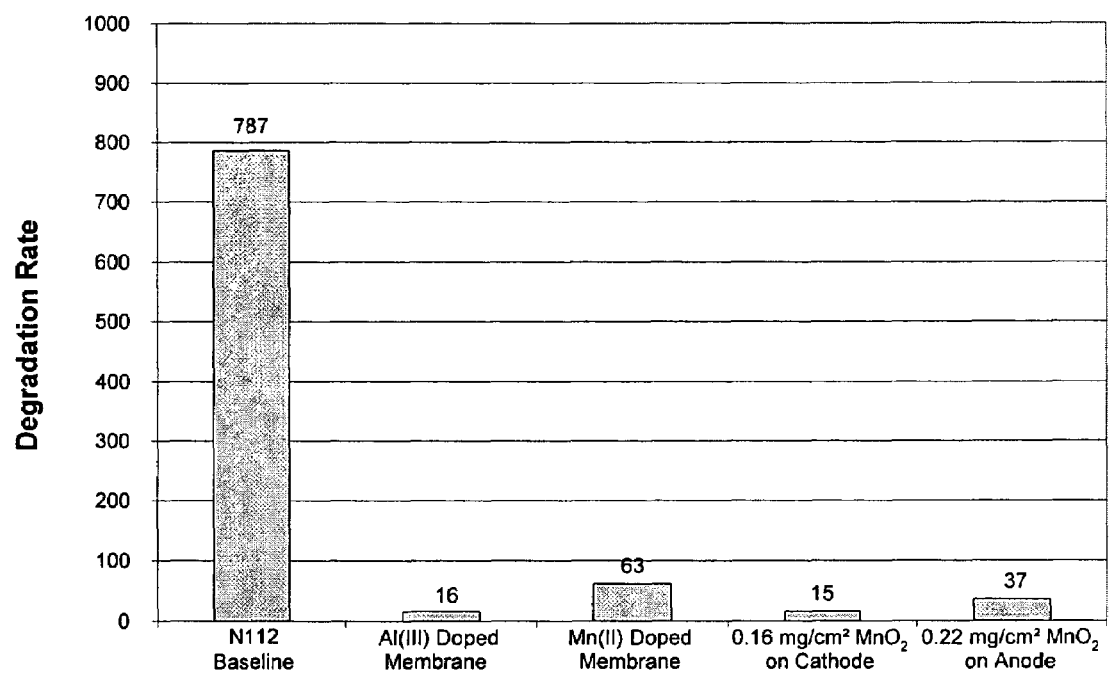
FIG. 1 is a graph illustrating the effect of Al(III), Mn(II) and $MnO_2$ on the degradation rate of the ion-exchange membrane.

Ion-exchange membranes degrade over time when subjected to the chemical environment found in a typical PEM fuel cell. In U.S. Pat. No. 6,335,112, the use of anti-oxidants within the membrane was disclosed to protect hydrocarbon based membranes from hydrogen peroxide. Without being bound by theory, hydrogen peroxide is believed to form at the cathode from the partial reduction of oxygen in the presence of hydrogen ions as in reaction (1) below instead of the typical 4 electron reduction as in reaction (2):

$$O_2 + 2H^+ + 2e^- \Rightarrow H_2O_2 \qquad (1)$$

$$O_2 + 4H^+ + 4e^- \Rightarrow H_2O_2 \qquad (2)$$

Hydrogen peroxide (including its radicals) is a highly reactive species that can damage and degrade components such as the ion-exchange membrane in a PEM fuel cell. Even though the '112 patent was limited to protecting hydrocarbon-based membranes, perfluorinated membranes such as Nafion®, which are more robust than hydrocarbon-based membranes, may still suffer membrane degradation within the fuel cell environment.

FIG. 1 shows the degradation rate of Nafion® 112 during operation in a PEM fuel cell. The degradation rate was determined by measuring the cumulative oxidant outlet conductivity (µS) of the effluent at open circuit voltage and dividing by the time (hours) of operation. The greater the conductivity of the oxidant effluent indicates that more HF was formed and hence more membrane degradation occurred. For Nafion® 112, the degradation rate was determined to be 787 µS/hour. Even for a perfluorinated membrane, significant membrane degradation is thus observed. A significant reduction in membrane degradation was observed when the membrane was doped with either Al(III) or Mn(II). For the Al(III) doped membrane, the degradation rate was reduced to 16 µS/hour and for the Mn(II) doped membrane, the degradation rate was 63 µS/hour. In other trials, a separate layer comprising $MnO_2$ was coated on either the cathode or anode electrodes prior to bonding to the membrane to form an MEA. When a 0.16 mg/cm² $MnO_2$ layer was coated on the cathode electrode prior to bonding with the membrane, the subsequent membrane degradation rate was only 15 µS/hour. Similarly, when a 0.22 mg/cm² $MnO_2$ layer was coated on the anode electrode prior to bonding with the membrane, the subsequent membrane degradation rate was only 37 µS/hour.

To summarize, FIG. 1 illustrates that Nafion® 112 undergoes significant membrane degradation under the operational conditions found in a PEM fuel cell and that Al(III), Mn(II) and $MnO_2$ significantly reduces such degradation. Little effect is observed if the additive is doped in the membrane or in a separate layer adjacent to the membrane on either the anode or cathode side. Proposed mechanisms for Al(III), Mn(II) and MnO$_2$ are discussed in greater detail below.

Figure 2:
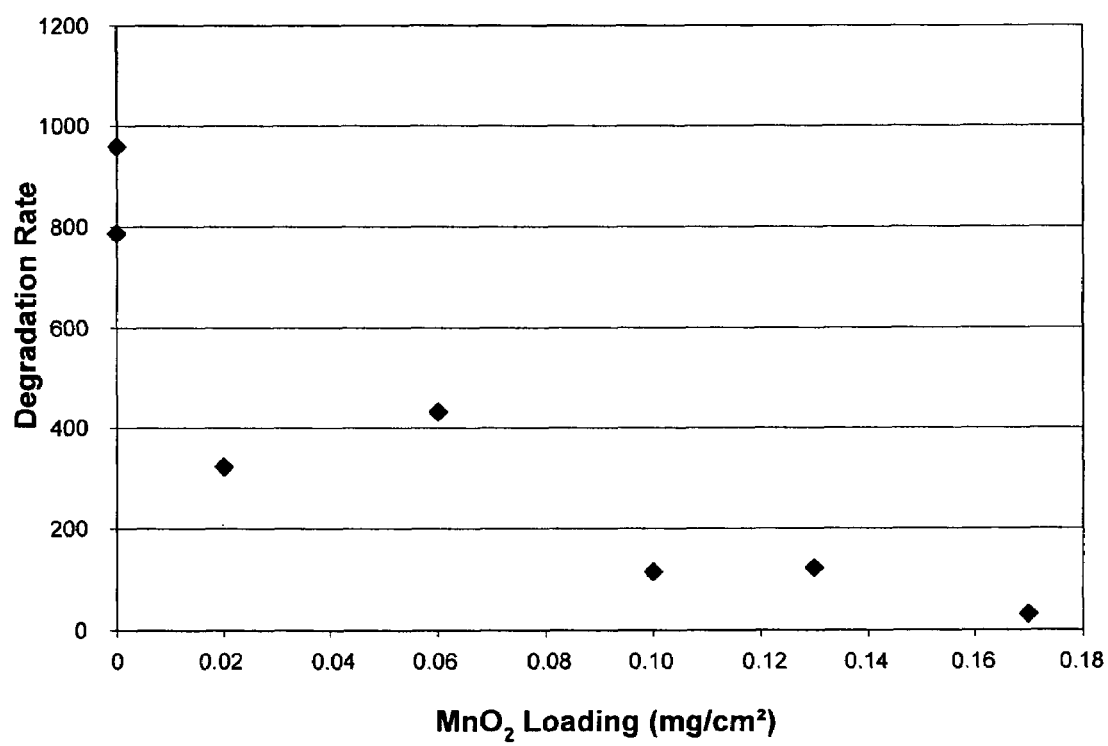
FIG. 2 is a graph illustrating the rate of ion-exchange membrane degradation as a function of the loading of $MnO_2$ on the ion-exchange membrane.

In FIG. 2, the loading of MnO$_2$ as a separate layer coated on the cathode electrode prior to bonding with a Nafion® 112 membrane was varied from 0 mg/cm$^2$ to 0.17 mg/cm$^2$ and the subsequent degradation rate in μS/hour was then determined as discussed above in reference to FIG. 1. Even with a loading as small as 0.02 mg/cm$^2$, the rate of membrane degradation is significantly reduced as compared to baseline Nafion® 112 where no MnO$_2$ is used. A trend is clearly observed such that the rate at which the membrane degrades decreases with increasing loadings of MnO$_2$ on the membrane.

Without being bound by theory, MnO$_2$ may function as a hydrogen peroxide decomposition catalyst through the following mechanism:

$$2MnO_2 + H_2O_2 \Rightarrow Mn_2O_3 + O_2 + H_2O \qquad (3)$$

In addition to MnO$_2$, the U.S. Pat. No. 6,335,112 and U.S. patent application No. 2003/0008196 disclose a large range of other metal oxide, metal salts and organometallic complexes or combinations thereof that have anti-oxidant behaviour. Many other anti-oxidants are known in the art and can be either catalytic or sacrificial. In particular, the additive may be a hydrogen peroxide decomposition catalyst such as an organometallic Mn(II) or Mn(III) complex, oxide catalysts, mixed oxide catalysts, and phosphites. Organic ligands suitable for the organometallic Mn(II) or Mn(III) complexes include, for example, 1,2-diaminocyclohexanetetracetate (CyDTA), ethylenediaminetetramethylene phosphonic acid (ENTMP), gluconate, N,N'-bis(salicylidene)propylenediamine, porphoryns, phthalocyanines, phenanthroline, hydrazine, pyrocatechol-3,5-disulphonic acid disodium salt, triethylenetetraamine, shiff base macrocycles, and EDDA.

Without being bound by theory, even though MnO$_2$ is known to have anti-oxidant properties (see the '112 patent), MnO$_2$ may be reduced in the fuel cell environment to Mn$^{2+}$. In particular, Mn$^{2+}$ may also act as a radical scavenger within the fuel cell environment. Other radical scavengers may include hindered amines, hydroxylamines, arylamines, phenols, BHT, phosphites, benzofuranones, salicylic acid, azulenyl nitrones and derivatives thereof, tocopherols, 5,5-dimethyl-1-pyrroline-N-oxide (DMPO), cyclic and acyclic nitrones (for example, alpha-phenyl-N-tert-butylnitrone (PBN), pyridine-N-oxide-4-N-tert-butylnitrone (POBN), ascorbic acid, gold-chitosan nanocomposites and dimethylpyrroline-N-oxide (DMPO) and quinones).

Without being bound by theory, the general mechanism for a radical scavenger may be as follows:

$$A + HO \cdot \Rightarrow A - OH \qquad (4)$$

And specifically, the reaction for salicylic acid (5) and DMPO (6) is as follows:

(5)

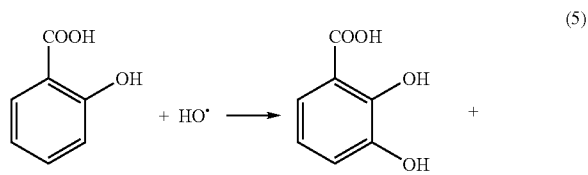

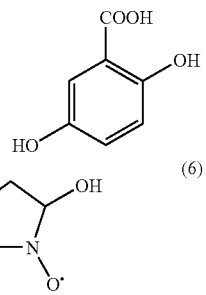

(6)

As shown in the reaction schemes (4)-(6) above, radical scavengers tend to be sacrificial though they may also be catalytic.

Instead of decomposing hydrogen peroxide or scavenging radicals, an additive may stabilize the hydrogen peroxide such that it becomes electrochemically reduced, removed in the exhaust of the PEM fuel cell or otherwise disposed of before chemically degrading any membrane present. Examples of hydrogen peroxide stabilizers include: stannic oxide (SnO$_2$.xH$_2$O), sodium aluminate (NaAlOx), hydrous alumina (Al$_2$O$_3$.xH$_2$O), Zn$^{2+}$ and sodium pyrophosphate (Na$_4$P$_2$O$_7$.10OH$_2$O) or a precursor thereof.

A further beneficial mechanism of Mn$^{2+}$ ions present in the fuel cell environment may be as a membrane cross-linker. Enhanced cross-linking within the ion-exchange membrane may result from the incorporation of, for example, a multivalent cation not known to produce radicals upon decomposition of hydrogen peroxide. In addition to Mn$^{2+}$, examples of such multivalent cations include Al$^{3+}$, Mg$^{2+}$ and Zn$^{2+}$. Such cations may increase the dimensional stability, the glass transition temperature and the thermal stability of the ion-exchange membrane. However, such cations may also change its water uptake, proton conductivity and water transference of the ion-exchange membrane which may in turn lead to reduced activity of the electrochemical fuel cell. Enhanced cross-linking of the ion-exchange membrane may have some desired and some undesired consequences. Multivalent cations can be introduced into the membrane electrode assembly as a metal salt, oxide or organometallic complex.

As shown above with respect to Mn$^{2+}$, a single additive may reduce membrane degradation and enhance membrane stability through multiple mechanisms.

Figure 3:
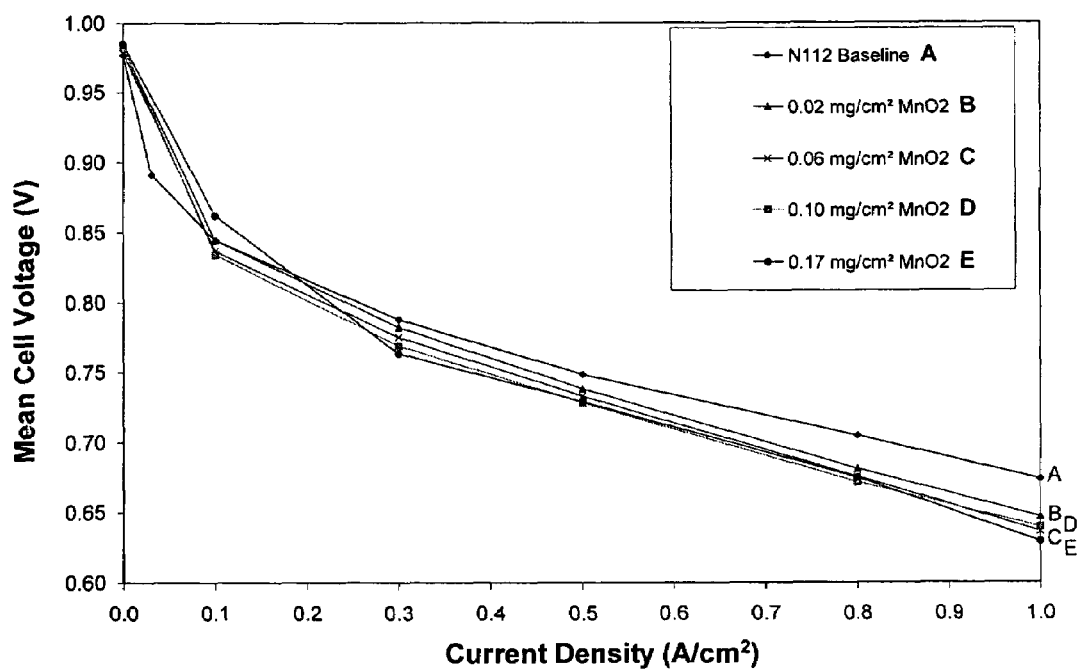
FIG. 3 is a graph illustrating performance loss of a fuel cell as a function of the loading of $MnO_2$ on the ion-exchange membrane.

Unfortunately, the performance of the fuel cell suffers in the presence of MnO$_2$ as shown in FIG. 3. FIG. 3 illustrates the fuel cell performance of a 5-cell stack. Example A was the baseline measurement with no MnO$_2$ present in the MEA. Examples B through E had loadings of 0.02, 0.06, 0.10 and 0.17 mg/cm$^2$ respectively on the cathode. Nafion® 112 was used as the membrane in all examples. Air stoichiometry was maintained at 1.8 and fuel stoichiometry was 1.5; temperature at the inlet was 70° C. The best performance was observed for the baseline MEA where no MnO$_2$ was present. Even for example B with only a 0.02 mg/cm$^2$ loading of MnO$_2$, a significant drop in performance as measured by mean cell voltage at a current density of 1.0 A/cm$^2$. Further, the results show that the drop in performance increases as you increase the loading from 0.02 to 0.17 mg/cm$^2$.

Figure 4:
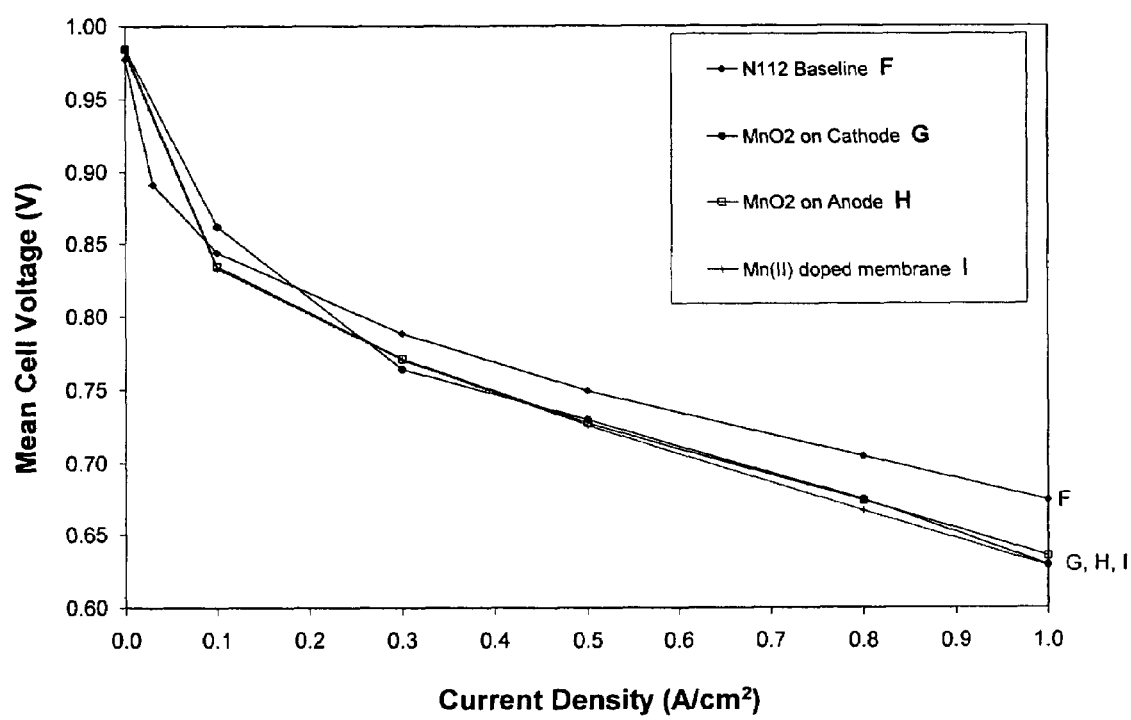
FIG. 4 is a graph illustrating the performance loss of a fuel cell as a function of the location of $MnO_2$ or Mn(II).

In FIG. 4, a similar 5 cell stack was run under similar conditions as under FIG. 3. Example F is the baseline MEA where no MnO2 was present. For example G, a 0.17 mg/cm$^2$ loading of MnO$_2$ was coated on the cathode electrode prior to bonding with a Nafion® 112 membrane. For example H, a 0.22 mg/cm$^2$ loading of MnO$_2$ was coated on the anode electrode prior to bonding with a Nafion® 112 membrane. For example I, a Nafion® 112 membrane was doped with Mn(II) prior to bonding with conventional electrodes to form the MEA. As shown in FIG. 3, a significant decrease in performance was observed with the incorporation of manganese into the membrane. However, there is little difference in performance whether the manganese is added as a layer of $MnO_2$ on the cathode, as a layer of $MnO_2$ on the anode or doped as Mn(II) in the membrane.

Figure 5A:
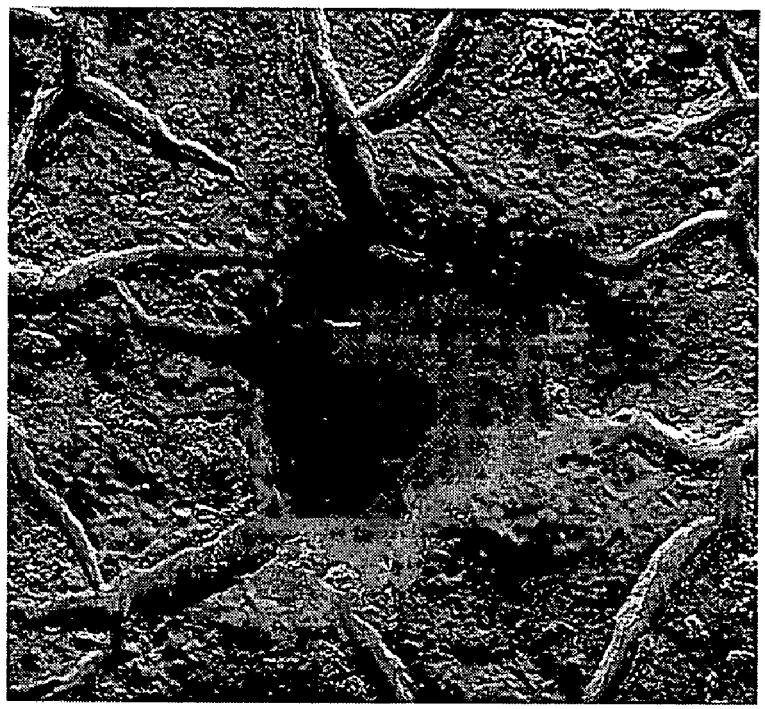
FIGS. 5a and 5b are scanning electron microscope images of an ion-exchange membrane undergoing degradation.
Figure 5B:
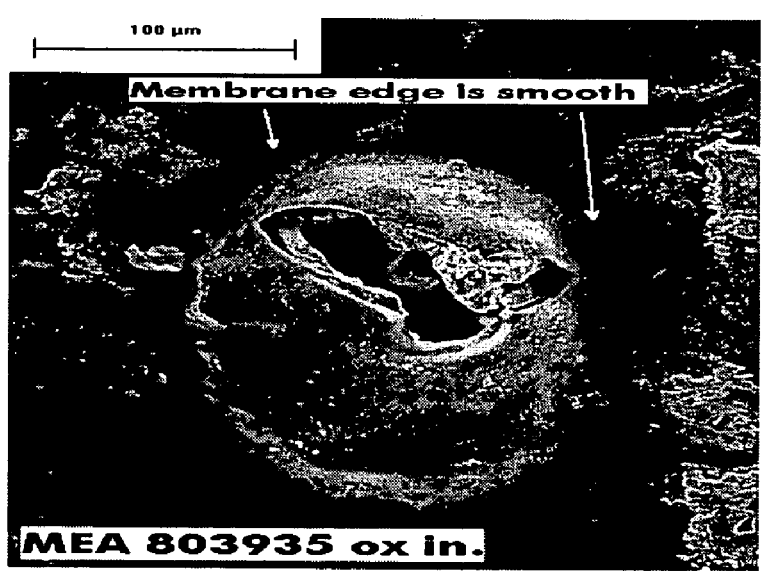

FIGS. 5a and 5b are scanning electron microscope images of a conventional membrane after operation and showing membrane degradation. In FIG. 5a, it can be clearly seen that membrane degradation results in thinning in discrete areas or divots in the membrane. In FIG. 5b, the thinned membrane has led to a rupture which would allow high levels of gas to cross-over between the anode and cathode and result in fuel cell failure. Further, the divots were clustered at the inlet and outlet regions of the cathode. In other fuel cell architectures, the divots may occur in other regions of the MEA or in only one of the inlet and outlet regions. Without being bound by theory, the inlet and outlet regions in the present example may be more susceptible to membrane degradation as the water content of the membrane in these regions may be lower than in the rest of the cell. An additional cause for increased susceptibility to membrane degradation may be that these regions operate at a higher temperature than other regions of the membrane. In some cell designs, an air bleed when running on reformate gas may result in regions where hydrogen and oxygen gas mix and the existence of hot spots which may in turn lead to increased membrane degradation in these regions. Further, some cell designs may have regions that operate at higher temperatures near the coolant outlet which may be the same or different than the inlet and outlet regions of the cathode.

Figure 6:
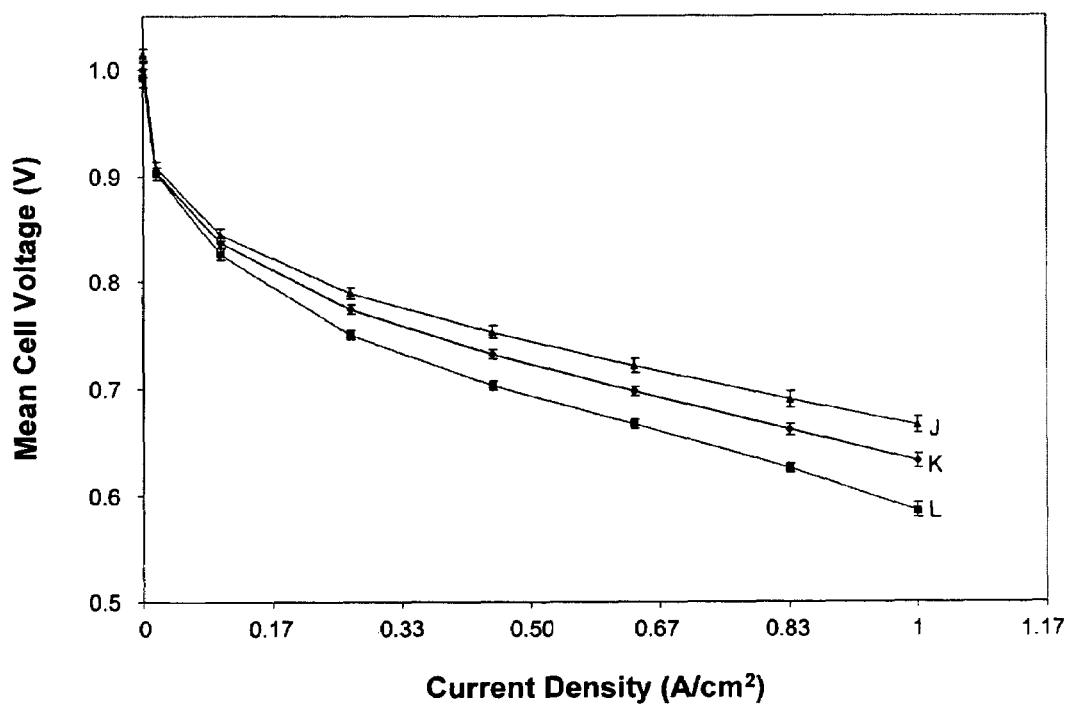
FIG. 6 is a graph illustrating the performance loss as a function of coverage of $MnO_2$ on the ion-exchange membrane.

Accordingly, additive only needs to be incorporated into the membrane or electrode in the regions susceptible to membrane thinning. In FIG. 6, fuel cell performance was observed comparing the percent coverage of $MnO_2$ on the cathode electrode. Example J shows the average performance of 15 baseline MEAs prepared and run as in FIG. 1 above without any $MnO_2$. Example K shows the average performance of 15 MEAs with a 0.2 mg/cm² loading of $MnO_2$ on the cathode electrode over 17% of the MEA surface (8.5% of the surface area of the MEA in the inlet region and 8.5% of the surface area of the MEA at the outlet region). Example L shows the average performance of 15 MEAs with a 0.2 mg/cm² loading of $MnO_2$ covering the entire cathode electrode. While there is still a reduction in performance as shown in example K, partial coverage of the MEA results in less of such a reduction in performance as compared to full coverage of the MEA.

Further, significant improvements in fuel cell longevity may still be observed with only partial coverage of the MEA. A 30-cell stack, based on 15 conventional MEAs as described above for FIGS. 1 and 15 MEAs incorporating a 0.2 mg/cm² loading of $MnO_2$ at the cathode electrode covering 17% of the MEA, was tested. The results are shown below in Table 1 where 33% of the MEAs had failed due to a rupture in the membrane at 1400 hours and 100% had failed by 2000 hours. In comparison, none of the MEAs had failed after 3600 hours with only partial coverage of $MnO_2$.

TABLE 1

| | MEA Failure | |
|---|---|---|
| Time/hours | Conventional MEA | MEA with $MnO_2$, 17% coverage |
| 1400 | 33% (5 of 15) | 0% |
| 1600 | 47% (7 of 15) | 0% |
| 1800 | 87% (13 of 15) | 0% |
| 2000 | 100% (15 of 15) | 0% |
| 3600 | 100% (15 of 15) | 0% |

Thus significant improvements in lifetime can still be observed with only partial coverage of the MEA with $MnO_2$. For maximum benefit, an understanding of the areas of the MEA which are more susceptible to membrane degradation would be helpful. As mentioned above, regions of the MEA localized at the inlet and outlet were found to be more susceptible to membrane degradation. However, for other fuel cell architectures, different regions of the MEA may be more susceptible to membrane degradation. An SEM or even visual inspection of a conventional MEA operated to membrane failure can be used by a person of ordinary skill in the art to ascertain which regions are more susceptible to degradation.

In an embodiment, the additive selected from a radical scavenger, a membrane cross-linker, a hydrogen peroxide decomposition catalyst and a hydrogen peroxide stabilizer is non-uniformly supported by at least one of the membrane, anode catalyst or cathode catalyst layer. Supported means that the additive may be dispersed within any or all of the membrane, anode catalyst or cathode catalyst layers or as a separate layer on the surface thereof. Even if placed as a separate layer on the surface, there may still be penetration in the z-direction into either the membrane or catalyst layer. Further, during operation of the fuel cell, the additive may migrate in either or both the x-y plane and z-direction. Non-uniform support may mean that an increased amount of additive is localized to certain regions of the membrane electrode assembly, for example those regions that are more susceptible to membrane degradation as in the examples discussed above.

In a further embodiment, the non-uniform dispersion of the additive is in the x-y plane of any or all of the membrane, anode or cathode catalyst layers. For example, there may be less than 80% coverage in the x-y plane, more particularly less than 50% coverage and even more particularly less than 25% coverage in the x-y plane. Further, there may be more than 1% coverage, more particularly more than 10% coverage and even more particularly more than 15% coverage in the x-y plane. The additive may be localized within a region of increased membrane susceptibility to degradation, for example, in one or both of the inlet and outlet regions.

Full coverage of the MEA may result in a significant performance reduction though may not be necessary to get sufficient lifetimes. In comparison, non-uniform coverage, particularly when localized to regions of increased susceptibility to membrane degradation, may result in less of a performance reduction while still maintaining significant lifetime improvements. Further, such non-uniform coverage may also result in a cost reduction as compared to full coverage of the MEA.

EXAMPLES

Nafion® 112 Doped with Al(III) or Mn(II)

Multivalent cations were ion-exchanged into the membrane by soaking the membrane in an aqueous solution of the appropriate cation overnight. Nafion® 112 membranes were used as received. Reagent grade $Al_2(SO_4)_3 \cdot xH_2O$ (Aldrich) and $MnSO_4$ (Aldrich) were used as appropriate without further purification. Solutions were prepared in deionized water with the amount of salt added calculated based on the percentage of sulfonic acid sites to be exchanged and taking into account the valency of the cation. A nominal equivalent weight value of 1050 g/mol for Nafion® 112 was used to calculate the moles of SO3-sites available per gram of membrane. Membranes were then rinsed with deionized water and immersed in deionized water for several hours. This process was completed at least 3 times, after which the membranes were allowed to air dry overnight between Kimwipes before bonding into a membrane electrode assembly.

Coating $MnO_2$ on Cathode

A pre-weighed vial was filled with 11 mL of 5% Nafion® solution, alcoholic. 0.62 g of $MnO_2$ (Aldrich) was added to the solution in order to obtain equal parts on a weight basis of $MnO_2$ and Nafion®. The vial containing $MnO_2$ and Nafion® solution was then sonicated in an ultrasonic bath for approximately one hour, stopping occasionally to shake any sediment that appeared. Each vial of suspension was decanted into a spray gun and manually sprayed onto a conventional cathode. Deionized water was used to wash rinsings from the vial into the spray gun and then manually sprayed onto the cathode. Once dry, the cathode was weighed to determine the total spray loading (approx. 0.2 mg/cm$^2$).

As appropriate, the amount of $MnO_2$ added to the 5% Nafion® solution, alcoholic was varied to obtain different $MnO_2$ loadings. Similarly, a mask may have been applied to the cathode with the spray coating applied only to the inlet/outlet regions of the cathode. In such a case, the volume of Nafion® solution used and the amount of $MnO_2$ added was varied accordingly to reflect the reduced area coated. As appropriate, the anode may have been coated instead of the cathode.

From the foregoing, it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A membrane electrode assembly comprising:
   an anode and a cathode fluid diffusion layer;
   an ion-exchange membrane interposed between the anode and cathode fluid diffusion layers; and
   an anode catalyst layer and a cathode catalyst layer interposed between the ion-exchange membrane and the respective fluid diffusion layer;
   wherein at least one of the ion-exchange membrane, the cathode catalyst layer and the anode catalyst layer non-uniformly supports at least one additive selected from a radical scavenger, a membrane cross-linker, a hydrogen peroxide decomposition catalyst and a hydrogen peroxide stabilizer, and
   wherein the additive is supported by the at least one ion-exchange membrane, cathode catalyst layer and anode catalyst layer such that the loading of the additive varies non-uniformly across the x-y plane of the at least one ion-exchange membrane, cathode catalyst layer and anode catalyst layer and an increased loading of the additive is located in regions of the membrane electrode assembly more susceptible to membrane degradation.

2. The membrane electrode assembly of claim 1 wherein the at least one ion-exchange membrane, cathode catalyst layer and anode catalyst layer has less than 80% coverage of the additive in the x-y plane.

3. The membrane electrode assembly of claim 1 wherein the at least one ion-exchange membrane, cathode catalyst layer and anode catalyst layer has less than 50% coverage of the additive in the x-y plane.

4. The membrane electrode assembly of claim 1 wherein the at least one ion-exchange membrane, cathode catalyst layer and anode catalyst layer has less than 25% coverage of the additive in the x-y plane.

5. The membrane electrode assembly of claim 1 wherein the at least one ion-exchange membrane, cathode catalyst layer and anode catalyst layer has between 1 and 25% coverage of the additive in the x-y plane.

6. The membrane electrode assembly of claim 1 wherein the at least one ion-exchange membrane, cathode catalyst layer and anode catalyst layer has between 10 and 25% coverage of the additive in the x-y plane.

7. The membrane electrode assembly of claim 1 wherein the at least one ion-exchange membrane, cathode catalyst layer and anode catalyst layer has between than 15 and 25% coverage of the additive in the x-y plane.

8. The membrane electrode assembly of claim 1 wherein the additive is dispersed within the at least one ion-exchange membrane, cathode catalyst layer and anode catalyst layer.

9. The membrane electrode assembly of claim 1 wherein the additive is in a layer on the surface of the at least one ion-exchange membrane, cathode catalyst layer and anode catalyst layer.

10. The membrane electrode assembly of claim 1 wherein the additive is a radical scavenger selected from hindered amines, hydroxylamines, arylamines, phenols, butylated hydroxytoluene, phosphites, benzofuranones, salicylic acid, azulenyl nitrones and derivatives thereof, tocopherols, 5,5-dimethyl-1-pyrroline-N-oxide, cyclic and acyclic nitrones, gold-chitosan nanocomposites, ascorbic acid and $Mn^{2+}$.

11. The membrane electrode assembly of claim 1 wherein the additive is a membrane cross-linker comprising a multivalent cation.

12. The membrane electrode assembly of claim 11 wherein the multivalent cation is selected from $Al^{3+}$, $Mn^{2+}$, $Mg^{2+}$ and $Zn^{2+}$.

13. The membrane electrode assembly of claim 12 wherein the additive is $Mn^{2+}$.

14. The membrane electrode assembly of claim 1 wherein the additive is a hydrogen peroxide decomposition catalyst selected from an organometallic Mn(II) or Mn(III) complex, oxide catalysts, mixed oxide catalysts, and phosphites.

15. The membrane electrode assembly of claim 14 wherein the additive is an organometallic Mn(II) or Mn(III) complex having an organic ligand selected from 1,2-diaminocyclohexanetetracetate, ethylenediaminetetramethylene phosphonic acid, gluconate, N,N'-bis(salicylidene)propylenediamine, porphoryns, phthalocyanines, phenanthroline, hydrazine, pyrocatechol-3,5-disulphonic acid disodium salt, triethylenetetraamine, shiff base macrocycles and ethylenediamine-N,N'-diacetic acid.

16. The membrane electrode assembly of claim 15 wherein the ligand is ethylenediamine-N,N'-diacetic acid.

17. The membrane electrode assembly of claim 14 wherein the additive is $MnO_2$, $Mn_2O_3$, $Mn_3O_4$ or $Mn_5O_8$.

18. The membrane electrode assembly of claim 1 wherein the additive is a hydrogen peroxide decomposition catalyst selected from a salt, oxide or organometallic complex of Co, Fe, Cr, Mn, Cu, V, Ru, Pd, Ni, Mo, Sn and W.

19. The membrane electrode assembly of claim 1 wherein the additive is a hydrogen peroxide stabilizer selected from stannic oxide, sodium aluminate, hydrous alumina, $Zn^{2+}$ and sodium pyrophosphate or a precursor thereof.

20. A fuel cell comprising the membrane electrode assembly of claim 1.

21. A fuel cell stack comprising at least one fuel cell of claim 20.

* * * * *